United States Patent
Lu et al.

(10) Patent No.: US 8,816,639 B2
(45) Date of Patent: Aug. 26, 2014

(54) CHARGE BALANCING TOPOLOGY

(75) Inventors: Cheng-Yi Lu, West Hills, CA (US);
Erich H. Soendker, Granada Hills, CA (US)

(73) Assignee: AeroJet Rocketdyne of DE, Inc., Canoga Park, CA (US)

( * ) Notice: Subject to any disclaimer, the term of this patent is extended or adjusted under 35 U.S.C. 154(b) by 381 days.

(21) Appl. No.: 13/151,694

(22) Filed: Jun. 2, 2011

(65) Prior Publication Data

US 2012/0306448 A1  Dec. 6, 2012

(51) Int. Cl.
*H02J 7/00* (2006.01)
(52) U.S. Cl.
CPC .................. *H02J 7/0016* (2013.01)
USPC ............ 320/118; 320/116; 320/121; 320/122
(58) Field of Classification Search
USPC .................. 320/118, 116, 121, 122
See application file for complete search history.

(56) References Cited

U.S. PATENT DOCUMENTS

| | | | | |
|---|---|---|---|---|
| 5,504,415 | A * | 4/1996 | Podrazhansky et al. | 320/118 |
| 5,825,155 | A * | 10/1998 | Ito et al. | 320/118 |
| 6,661,198 | B2 * | 12/2003 | Furukawa | 320/118 |
| 7,332,891 | B2 * | 2/2008 | Sugimoto | 320/116 |
| 7,609,030 | B2 * | 10/2009 | Uesugi et al. | 320/118 |
| 2009/0251100 | A1 | 10/2009 | Incledon et al. | |
| 2011/0127961 | A1 * | 6/2011 | Tillmann et al. | 320/116 |
| 2011/0156650 | A1 * | 6/2011 | Yang et al. | 320/118 |
| 2011/0169453 | A1 * | 7/2011 | Maruyama et al. | 320/118 |
| 2011/0234165 | A1 * | 9/2011 | Palatov | 320/119 |

* cited by examiner

*Primary Examiner* — M'Baye Diao
(74) *Attorney, Agent, or Firm* — Joel G Landau

(57) ABSTRACT

A rechargeable battery assembly provides load balancing for individual battery cells making up a battery assembly. The battery assembly includes a plurality of series-connected battery cell assemblies. Each battery cell assembly includes a battery cell and a charge bypass load connected in parallel with the battery cell. A cell supervisory circuits (CSCs) and battery interface unit (BUI) interface between the battery cell assembly and a battery charge/discharge circuit to provide load balancing by comparing the voltages monitored with respect to each battery cell assembly to an end of charge voltage (EOCV) threshold and in response to the monitored voltage equaling the EOCV threshold issues a charge bypass command to the CSC to activate the charge bypass load.

16 Claims, 3 Drawing Sheets

CHARGE BALANCING TOPOLOGY

BACKGROUND

The present invention is related to batteries, and in particular to battery charge topologies.

Battery chemistry plays an important role in how batteries are charged. For example, nickel-hydrogen (Ni—H2) batteries are somewhat tolerant of overcharging. In contrast, lithium-ion batteries are not, and must therefore be accompanied by a charging unit capable of controlling the charge on the battery cells to specified values.

This is problematic in legacy systems when batteries are replaced with batteries of a different chemistry. For example, when replacing Ni—H2 batteries with lithium-ion batteries, a constant current charging apparatus commonly employed to charge the Ni—H2 batteries would likely result in damage to the lithium-ion batteries. One solution is to replace the entire battery system, but this is costly and therefore impractical in many applications.

SUMMARY

A rechargeable battery assembly provides load balancing for individual battery cells making up a battery assembly. The battery assembly includes a plurality of series-connected battery cell assemblies connected between an input terminal and an output terminal of the battery assembly. Each battery cell assembly includes a battery cell and a charge bypass load connected in parallel with the battery cell. One or more cell supervisory circuits (CSCs) monitor and communicate with each of the plurality of series-connected battery cell assembly, including monitoring the voltage associated with the battery cell assembly and providing commands to selectively activate the charge bypass load. A battery interface unit (BIU) is connected to communicate with the one or more CSCs as well as with a battery charge/discharge module external to the battery assembly. The BIU receives voltages monitored by the one or more CSCs and provides charge bypass commands to the one or more CSCs. The BIU provides charge balancing by comparing the voltages monitored with respect to each battery cell assembly to an end of charge voltage (EOCV) threshold and in response to the monitored voltage equaling the EOCV threshold issues a charge bypass command to the CSC to activate the charge bypass load to limit voltage on the corresponding battery cell.

DETAILED DESCRIPTION

Figure 1:
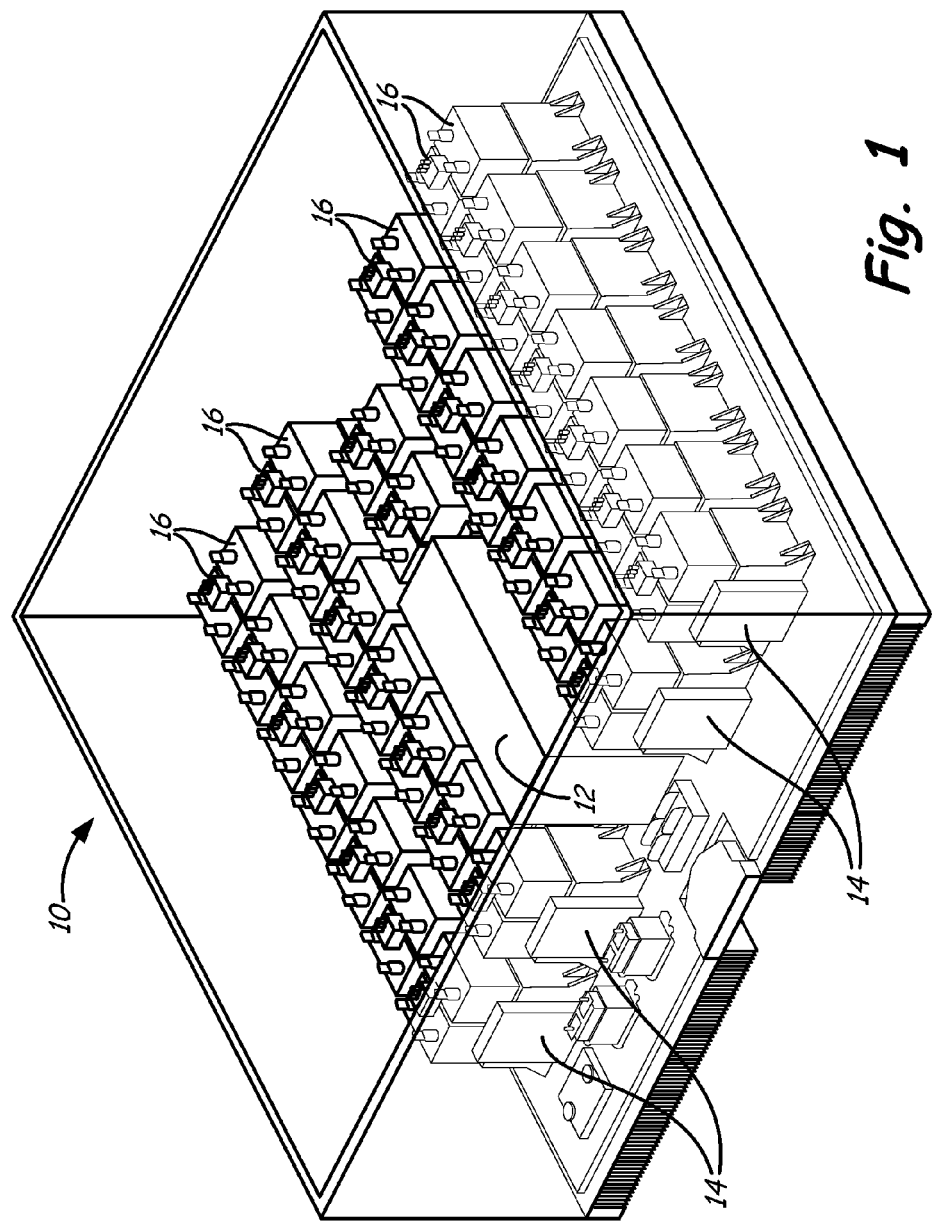
FIG. 1 is an orthogonal view of a battery assembly according to an embodiment of the present invention.

FIG. 1 is an orthogonal view of battery pack assembly 10 according to an embodiment of the present invention. The battery pack assembly 10 is also referred to as a rechargeable battery assembly or simply a battery assembly. Battery pack assembly 10 includes battery interface unit (BIU) 12, one or more cell supervisory circuits (CSCs) (collectively, CSCs 14), and a plurality of series-connected battery cell assemblies 16.

The plurality of battery cell assemblies 16 are connected in series with one another between two output terminals (not shown). During discharge, the voltage provided at the output terminals of battery pack assembly 10 is the sum of the voltages provided by each of the individual battery cell assemblies 16. During charge, current is supplied by a battery charge/discharge unit (BCDU), shown in FIG. 2, to the output terminals of battery pack assembly 10, which provides the charging current to each of the plurality of battery cell assemblies 16.

To accommodate various charging sources, distributed charge control is employed wherein voltage at each of the plurality of battery cell assemblies 16 is monitored and individually controlled to provide charge balancing. In this way, charging of the battery cell assemblies 16 is controlled despite the charging source connected to supply charging power to battery pack assembly 10. The benefit of providing distributed charge control is battery pack assembly 10 can be employed with charging sources not originally intended to be used with battery cells having a particular type of chemistry. In one embodiment, Lithium-ion (Li-ion) battery cells may be employed in systems originally designed for use with Nickel-Hydrogen batteries.

In the embodiment shown in FIG. 1, BIU 12 interfaces with each of the plurality of CSCs 14 to provide charge balancing to the plurality of battery cell assemblies 16. Charge balancing ensures that each battery cell assembly 16 is charged to a desired voltage without damaging the battery cells by overcharging. As described in more detail with respect to FIG. 2, each battery cell assembly 16 includes a charge bypass load that allows for selective control of the battery cell assembly voltage.

Figure 2:
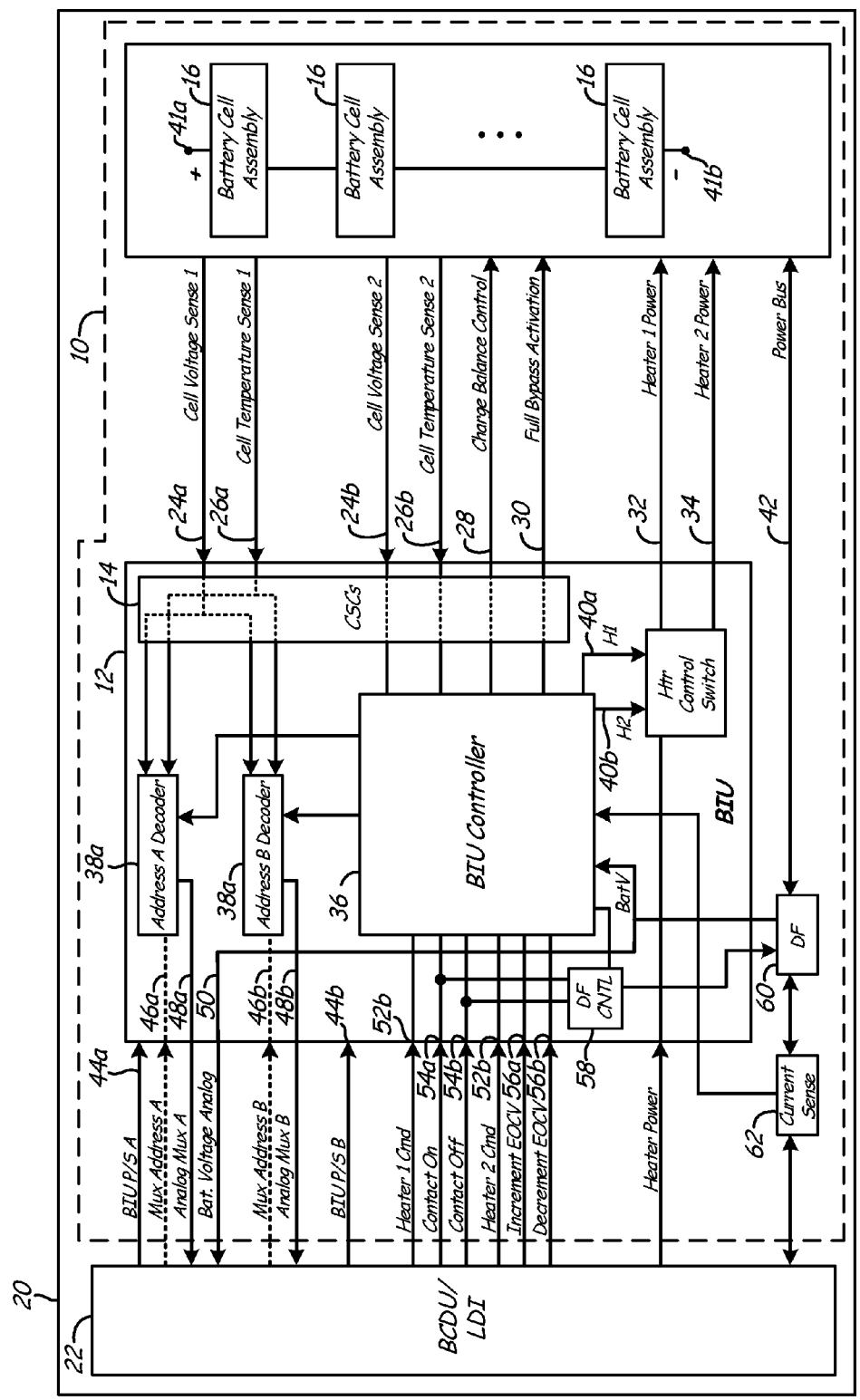
FIG. 2 is a block diagram illustrating communication between the lithium-ion battery assembly and a legacy battery charge/discharge unit according to an embodiment of the present invention.

FIG. 2 is a block diagram illustrating communication between the battery pack assembly 10 and a battery charge/discharge unit (BCDU) 22 (which may be a legacy unit) forming a rechargeable battery system 20 according to an embodiment of the present invention.

In the embodiment shown in FIG. 2, the one or more CSCs 14 are illustrated as being included as part of BIU 12. In other embodiments (such as the embodiment shown in FIG. 1), the one or more CSCs are physically separate from the BIU. Also, in some embodiments a single CSC 14 may be employed to communicate with each battery cell assembly 16, or a dedicated CSC 14 may be associated with each battery cell assembly 16.

Distributed charge control is provided by one or more CSCs 14 associated with each of the plurality of battery cell assemblies 16. In the embodiment shown in FIG. 2, CSC 14 receives a first voltage sense signal 24a, second voltage sense signal 24b, first temperature sense signal 26a, and second temperature sense signal 26b associated with each of the plurality of battery cell assemblies 16. In this way, the voltage and temperature of each battery cell assembly 16 is individually monitored. In addition, CSC 14 provides a charge balance control signal 28 and a full bypass activation signal 30 (originating with BIU controller 36) to each of the plurality of battery cell assemblies 16. The charge balance control signal 28 selectively connects a charge bypass load (shown in FIG. 3) across the battery cell (shown in FIG. 3) when the monitored voltage (as provided by second voltage sense input 24b) indicates the cell has reached an end-of-charge voltage (EOCV). The charge bypass load prevents the battery cell from continuing to charge to a voltage exceeding the EOVC. The full bypass activation signal 30 is a protection signal used to selectively disconnect and isolate a particular battery cell from the series-connected stack of battery cells.

Monitored voltages and temperatures sensed by CSC 14 are supplied to BIU controller 36 as well as BCDU 22 via multiplexers 38a and 38b. BIU controller 36 monitors the voltage and temperature values provided by each of the plurality of CSCs 14 and in response generates the charge balance control signal 28 and full bypass activation signal 30. As discussed above, in response to the second voltage sense signal 24b for a particular battery cell assembly 16 reaching an EOCV threshold, BIU controller 36 provides a charge balance control signal 28 to activate the charge bypass load associated with the particular battery cell assembly 16 to maintain the cell voltage at the desired EOCV threshold.

BIU controller 36 also monitors the second temperature sense signal 26b to ensure each of the battery cell assemblies 16 is maintained above a minimum threshold temperature. If the second temperature sense signal 26b indicates one or more of the battery cell assemblies 16 is less than the temperature threshold value, BIU controller 36 issues heater command signals 40a and/or 40b to selectively supply heater power 32 and 34 to battery cell assemblies 16. In one embodiment, a resistive heater network is employed within battery pack assembly 10 to generate heat in response to power provided via heater power lines 32 and/or 34.

BCDU 22 provides charging current (and receives discharge current) via power bus 42 to the plurality of battery cell assemblies 16 included within battery pack assembly 10. Charging/discharging power is not provided to individual cells, but rather to the plurality of battery cell assemblies 16 as a whole, with BIU 12 being responsible for controlling the individual charging of each of the plurality of battery cell assemblies 16.

BCDU 22 provides redundant housekeeping power to BIU 12 via BIU power supply (P/S) inputs 44a and 44b. BCDU 22 monitors voltages and temperatures sensed by CSC 14 via multiplexers 38a and 38b, respectively. For example, first voltage sense signal 24a is provided from each of the plurality of battery cell assemblies 16 via CSC 14 to multiplexer 38a. Multiplexer address 46a provided by BCDU 22 to multiplexer 38a selects one of the plurality of voltage sense signals associated with one of the plurality of battery cell assemblies 16 for provision to BCDU 22. In addition, BCDU 22 monitors the output voltage (at output terminals 41a, 41b) provided by the plurality of battery cell assemblies 16 (i.e., the sum of the voltage provided by each of the plurality of battery cell assemblies 16) via battery voltage signal 50. Based on the monitored battery voltage, as well as the voltages monitored with respect to each of the plurality of battery cell assemblies 16, BCDU determines the state of charge (SOC) associated with battery assembly 10.

Based on the monitored voltages associated with each battery cell assembly 16 and/or the battery assembly voltage, BCDU 22 varies the magnitude of the current supplied to battery pack assembly 10. In one embodiment, BCDU 22 compares the monitored voltage associated with each battery cell assembly 16 with an EOVC threshold voltage, and decreases the constant current setpoint associated with current supplied via power bus 42 to battery assembly 10. For example, if BCDU 22 is supplying a two ampere charging current to battery assembly 10, in response to one of the plurality of monitored battery cell assembly voltages being equal to the EOCV threshold, BCDU 22 decreases the charging current from two amperes to one ampere. This has the effect of reducing the EOCV voltage at each of the plurality of battery cell assemblies 16.

Similarly, multiplexer address input 46b provided by BCDU 22 to multiplexer 38b selects one of the plurality of temperature sense signals associated with one of the plurality of battery cell assemblies 16 for provision to BCDU 22. Based on the monitored temperatures, BCDU 22 provides commands (e.g., heater commands 52a, 52b) to BIU 36 to apply heating power to battery assembly 10 (i.e., to the plurality of battery cell assemblies 16 included within battery assembly 10).

BCDU 22 provides a number of other command signals to BIU controller 36, including contactor commands 54a, 54b, and EOCV commands (increment, decrement) 56a, 56b. Contactor commands 54a, 54b are used to selectively connect and disconnect, respectively, battery pack assembly 10 from BCDU 22 via deadface (DF) relay 60. In the embodiment shown in FIG. 2, DF relay 60 consists of a normally open contact and an auxiliary contact (not shown). Both contacts/relays are connected in series with power bus 42, with one connected to the positive output terminal 41a associated with the plurality of battery assemblies 16, and one connected to a negative output terminal 41b associated with the plurality of battery assemblies 16. DF relay 60 allows BCDU to take Li-ion battery assembly 16 offline on command or as a result of an out-of-limit condition. Current sensor 62 is likewise connected in series with DF relay 60 on power bus 42, and provides a current sense signal to BIU controller 36.

BCDU 22 also provides EOCV commands 56a, 56b to BIU controller 36 to either increment or decrease the EOCV setpoints associated with each of the plurality of battery cell assemblies 16. This provides flexibility in programming the EOCV commands in response to changing conditions or in response to the installation of new battery cells with different operating parameters.

Figure 3:
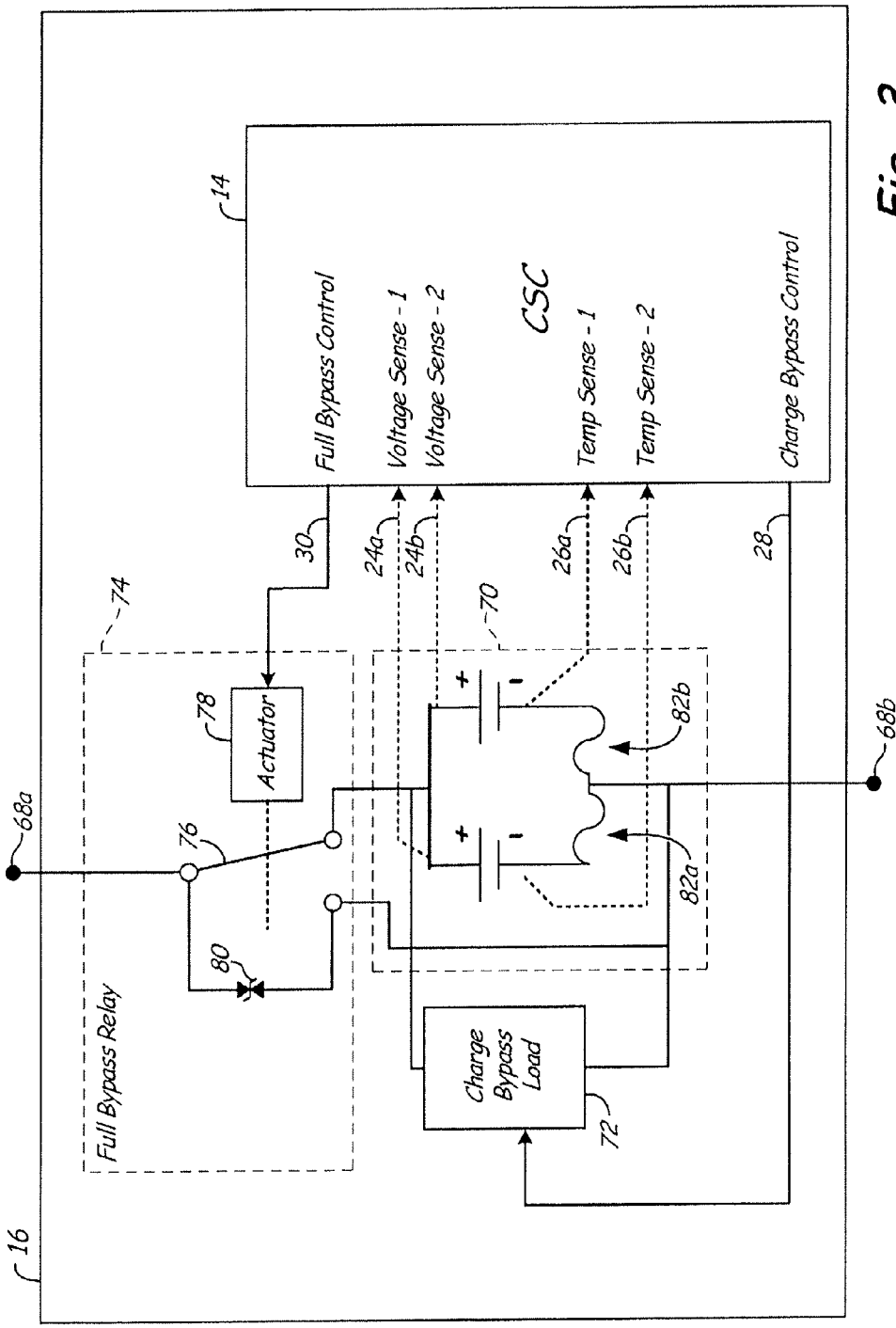
FIG. 3 is a circuit diagram of a battery cell assembly included within the battery assembly according to an embodiment of the present invention.

FIG. 3 is a circuit diagram of communication between one of the plurality of cell supervisory circuits (CSC) 14 and battery cell assembly 16, which includes a positive output terminal 68a and a negative output terminal 68b for series-connections to other battery cell assemblies 16.

In the embodiment shown in FIG. 3, battery cell assembly 16 includes battery cell 70 (illustrated here as a virtual cell with first and second battery cell components), charge bypass load 72 and full bypass relay 74. As described with respect to FIG. 2, CSC 14 provides redundant voltage monitoring of the cell voltage via first voltage sense signal 24a and second voltage sense signals 24b, and redundant temperature monitoring of the cell via first temperature sense signal 26a and second temperature sense signal 26b. In addition, CSC 14 provides inputs to battery cell assembly 16 that include charge bypass control signal 28 and full bypass control signal 30.

During a normal charge operation, charging current provided via output terminals 68a is communicated via full bypass relay 74 to battery cell 70. The charging current causes the voltage of battery cell 70 to increase, as monitored by CSC 14 via first voltage sense signal 24a and second voltage sense signal 24b. When the monitored voltage on battery cell 70 reaches the EOCV threshold, charge bypass load 72 is activated by CSC 14 via charge balance control signal 28. In some embodiments the comparison may be performed locally by CSC 14 or by BIU controller 36 with subsequent instructions provided to CSC 14. Charge bypass load 72 is connected in parallel with battery cell 70, and when activated presents an alternative circuit path that reduces the charging current provided to battery cell 70, thereby maintaining the voltage on battery cell 70 below the EOCV threshold.

In the event battery cell 70 becomes damaged, or otherwise needs to be electrically isolated from other battery cells within battery assembly 16, CSC 14 activates full bypass relay 74. When activated/energized, full bypass relay disconnects battery cell 70 from output terminal 68a, and creates a short-circuit path directly between output terminal 68a and output terminal 68b. When activated, battery cell 70 will be removed from the array of series-connected battery cells included within battery assembly 16, while still allowing the remainder of the battery cells to receive charging power. Full bypass relay 74 can be used to isolate a faulty battery cell or to disconnect a battery cell from charging in the event charge bypass load 72 is non-responsive. Transorb 80 is connected in parallel with contact 76 of full bypass relay 74 to provide continuous current flow during relay activation.

Fuses 82a and 82b provide overcurrent protection to battery cell 70. However, unlike charge bypass load 72 and full bypass relay 74, fuses 82a and 82b cannot be reset and should therefore be selected to trip only in the event that damage may otherwise occur to battery cell 70.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rechargeable battery assembly comprising:
a plurality of series-connected battery cell assemblies connected between an input terminal and an output terminal of the rechargeable battery assembly, each battery cell assembly including a battery cell and a charge bypass load connected in parallel with the battery cell;
a plurality of cell supervisory circuits (CSCs), each of the plurality of CSCs being in communication with one of the plurality of series-connected battery cells to monitor a voltage associated with each series-connected battery cell and provide commands to selectively activate the charge bypass load; and
a battery interface unit (BTU) connected to receive voltages monitored by each of the plurality of CSCs and to provide charge bypass commands to each of the plurality of CSCs, wherein the BIU compares the monitored voltages received from each of the plurality of CSCs to an end of charge voltage (EOCV) threshold and in response to the monitored voltage equaling the EOCV threshold issues a charge bypass command to the associated CSC that activates the charge bypass load to limit voltage on the corresponding battery cell,
wherein at least one of the plurality of CSCs is configured to monitor a temperature associated with a corresponding battery cell assembly, and
wherein at least one of the plurality of series-connected battery cell assemblies further includes a full bypass relay having an active state and an inactive state, wherein in the active state the full bypass relay creates a short-circuit path between an input terminal and an output terminal of the series-connected battery cell assembly that bypasses the battery cell and the charge bypass load.

2. The rechargeable battery assembly of claim 1, wherein the monitored temperature is communicated to the BIU.

3. The rechargeable battery assembly of claim 1, wherein the EOCV threshold is programmable by the battery charge/discharge unit.

4. The rechargeable battery assembly of claim 1, wherein the plurality of series-connected battery cell assemblies are lithium-ion battery cell assemblies.

5. The rechargeable battery assembly of claim 4, wherein a charging current is provided to the lithium-ion battery cell assemblies by a constant current source battery charge/discharge unit.

6. A rechargeable battery assembly comprising:
a plurality of series-connected battery cell assemblies connected between an input terminal and an output terminal of the rechargeable battery assembly, each battery cell assembly including a battery cell and a charge bypass load connected in parallel with the battery cell;
a plurality of cell supervisory circuits (CSCs), each of the plurality of CSCs being in communication with one of the plurality of series-connected battery cells to monitor a voltage associated with each series-connected battery cell and provide commands to selectively activate the charge bypass load; and
a battery interface unit (BIU) connected to receive voltages monitored by each of the plurality of CSCs and to provide charge bypass commands to each of the plurality of CSCs, wherein the BIU compares the monitored voltages received from each of the plurality of CSCs to an end of charge voltage (EOCV) threshold and in response to the monitored voltage equaling the EOCV threshold issues a charge bypass command to the associated CSC that activates the charge bypass load to limit voltage on the corresponding battery cell
wherein at least one of the plurality of CSCs is configured to monitor a temperature associated with a corresponding battery cell assembly, wherein the monitored temperature is communicated to the BIU;
a resistive heater network connected to receive power from a battery charge/discharge unit configured to supply current to the battery assembly; and
a heater control switch controllable by the BIU to selectively apply heat to the plurality of series-connected battery cell assemblies, wherein the BIU is configured to activate the heat control switch when the monitored temperature is less than a threshold temperature value.

7. A rechargeable battery system comprising:
a plurality of series-connected battery cell assemblies, each of the plurality of series-connected battery cell assemblies including a battery cell and a charge bypass circuit connected in parallel with the battery cell;
one or more cell supervisory circuits (CSCs) connected to monitor voltages associated with each of the plurality of battery cells and to provide control instructions to selectively activate/deactivate the charge bypass circuits associated with each of the plurality of battery cells;
a battery interface unit (BIU) connected to receive the voltages monitored by the one or more CSCs and to provide charge balance instructions to the one or more CSCs to selectively activate/deactivate the charge bypass circuits, wherein the BIU compares the received voltages to an end of charge voltage (EOCV) threshold value, and in response to a received voltage associated with one of the battery cells exceeding the EOCV threshold value, the BIU selectively activates the charge bypass circuit associated with the battery cell exceeding the EOCV threshold value; and
a battery charge/discharge unit (BCDU) configured to provide a constant current charging current to the battery assembly and receive the voltages monitored by the one or more CSCs, wherein the BCDU is configured to decrease an amplitude of the constant current charging current in response to one or more of the monitored voltages exceeding a threshold value,
wherein the plurality of series-connected battery cell assemblies further include a full bypass relay having an active state and an inactive state selectively controlled by the BIU, wherein in the active state the full bypass relay creates a short-circuit path between an input terminal and an output terminal of the series-connected battery cell assembly that electrically isolates the battery cell assembly from the other series-connected battery cell assemblies.

8. The rechargeable battery system of claim 7, wherein the threshold value employed by the BCDU is equal to the EOCV threshold value.

9. The rechargeable battery system of claim 7, wherein at least one of the plurality of CSCs is configured to monitor a temperature associated with a corresponding battery cell assembly, wherein the monitored temperature is communicated to the BIU.

10. The rechargeable battery system of claim 7, wherein the BCDU is configured to provide control instructions to the BIU to program the EOCV thresholds employed by the BIU.

11. The rechargeable battery system of claim 7, wherein the battery cells are lithium-ion battery cells.

12. A rechargeable battery system comprising:
a plurality of series-connected battery cell assemblies, each of the plurality of series-connected battery cell assemblies including a battery cell and a charge bypass circuit connected in parallel with the battery cell;
one or more cell supervisory circuits (CSCs) connected to monitor voltages associated with each of the plurality of battery cells and to provide control instructions to selectively activate/deactivate, the charge bypass circuits associated with each of the plurality of battery cells;
a battery interface unit (BIU) connected to receive the voltages monitored by the one or more CSCs and to provide charge balance instructions to the one or more CSCs to selectively activate/deactivate the charge bypass circuits, wherein the BIU compares the received voltages to an end of charge voltage (EOCV) threshold value, and in response to a received voltage associated with one of the battery cells exceeding the EOCV threshold value, the BIU selectively activates the charge bypass circuit associated with the battery cell exceeding the EOCV threshold value, wherein at least one of the plurality of CSCs is configured to monitor a temperature associated with a corresponding battery cell assembly, wherein the monitored temperature is communicated to the BIU;
a battery charge/discharge unit (BCDU) configured to provide a constant current charging current to the battery assembly and receive the voltages monitored by the one or more CSCs, wherein the is configured to decrease an amplitude of the constant current charging current in response to one or more of the monitored voltages exceeding a threshold value;
a resistive heater network connected to receive power from the BCDU; and
a heater control switch controllable by the BIU to selectively apply heat to the plurality of series-connected battery cell assemblies, wherein the BIU is configured to activate the heat control switch when the monitored temperature is less than a threshold temperature value.

13. A rechargeable battery assembly comprising:
a plurality of series-connected battery cell assemblies connected between an input terminal and an output terminal of the rechargeable battery assembly, each battery cell assembly including a battery cell and a charge bypass load connected in parallel with the battery cell, wherein at least one of the plurality of series-connected battery cell assemblies further includes a full bypass relay having an active state and an inactive state, wherein in the active state the full bypass relay creates a short-circuit path between an input terminal and an output terminal of the series-connected battery cell assembly that bypasses the battery cell and the charge bypass load;
a plurality of cell supervisory circuits (CSCs), each of the plurality of CSCs being in communication with one of the plurality of series-connected battery cells to monitor a voltage associated with each series-connected battery cell and provide commands to selectively activate the charge bypass load and the full bypass relay; and
a battery interface unit (BIU) connected to receive voltages monitored by each of the plurality of CSCs and to provide charge bypass and full bypass commands to each of the plurality of CSCs.

14. The rechargeable battery assembly of claim 13, wherein the short circuit path electrically isolates the battery cell assembly from the other series-connected battery cell assemblies.

15. The rechargeable battery assembly of claim 13, wherein at least one of the plurality of CSCs is configured to monitor a temperature associated with a corresponding battery cell assembly.

16. The rechargeable battery system of claim 15, further comprising:
a resistive heater network connected to receive power from a battery charge/discharge unit (BCDU) configured to provide a constant current charging current to the battery assembly; and
a heater control switch controlled by the BIU to selectively apply heat to the plurality of series-connected battery cell assemblies, wherein the monitored temperature is communicated to the BIU, and wherein the BIU is configured to activate the heat control switch when the monitored temperature is less than a threshold temperature value.

* * * * *